United States Patent [19]

Kawarada

[11] Patent Number: 4,530,034
[45] Date of Patent: Jul. 16, 1985

[54] BATTERY CONTAINMENT APPARATUS FOR ELECTRONIC FLASH

[75] Inventor: Osamu Kawarada, Fuchu, Japan

[73] Assignee: Olympus Optical Company Ltd., Tokyo, Japan

[21] Appl. No.: 532,981

[22] Filed: Sep. 16, 1983

[30] Foreign Application Priority Data

Nov. 26, 1982 [JP] Japan ............................. 57-207211
Nov. 26, 1982 [JP] Japan ........................ 57-178540[U]
Nov. 26, 1982 [JP] Japan ........................ 57-178541[U]

[51] Int. Cl.³ ............................................. G03B 15/02
[52] U.S. Cl. .......................................... 362/9; 429/123
[58] Field of Search ............... 429/1, 9, 99, 123, 98; 362/9

[56] References Cited

U.S. PATENT DOCUMENTS

| | | | |
|---|---|---|---|
| 1,887,811 | 11/1932 | Ikin | 429/99 |
| 2,209,185 | 7/1940 | Bower et al. | 429/159 |
| 2,243,942 | 6/1941 | Briggs | 429/9 |
| 2,668,868 | 2/1954 | Nelson | 429/9 |
| 2,953,675 | 9/1960 | Kluge | 362/9 |
| 3,563,807 | 2/1971 | Brindley et al. | 429/99 |
| 3,941,618 | 3/1976 | Mabuchi | 429/99 |
| 4,160,857 | 7/1979 | Nardella et al. | 429/99 |

FOREIGN PATENT DOCUMENTS

| | | | |
|---|---|---|---|
| 5011526 | 5/1973 | Japan | |
| 79850 | 6/1981 | Japan | 429/1 |
| 0226130 | 12/1924 | United Kingdom | 429/99 |
| 2085219 | 4/1982 | United Kingdom | 429/123 |

Primary Examiner—Donald L. Walton
Attorney, Agent, or Firm—Louis Weinstein

[57] ABSTRACT

A battery containment apparatus for electronic flash contains a plurality of batteries, which are grouped into a plurality of battery banks, each including a substantially equal number of batteries. Each bank defines a d.c. source. The apparatus improves the portable use and the ease of operation of an electronic flash while assuring an efficient utilization of the battery capacity when it is used with an electronic flash which requires a plurality of d.c. sources, for example, an electronic flash including a plurality of DC-DC converters which must be energized by a plurality of d.c. sources.

25 Claims, 30 Drawing Figures

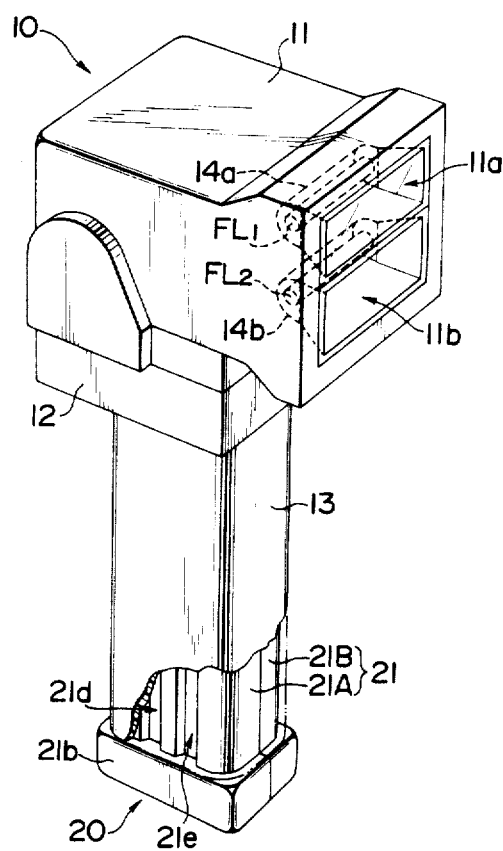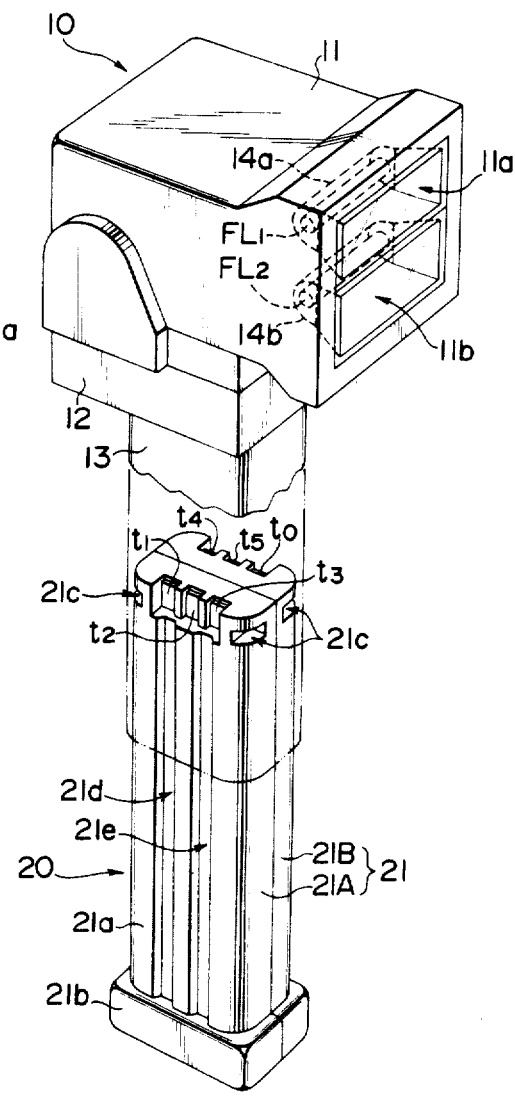

FIG. 28
FIG. 29
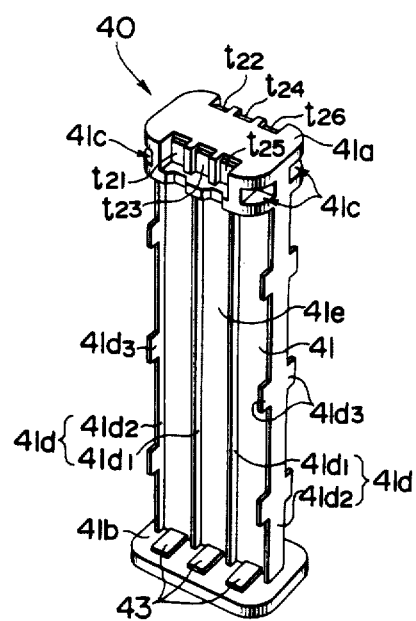
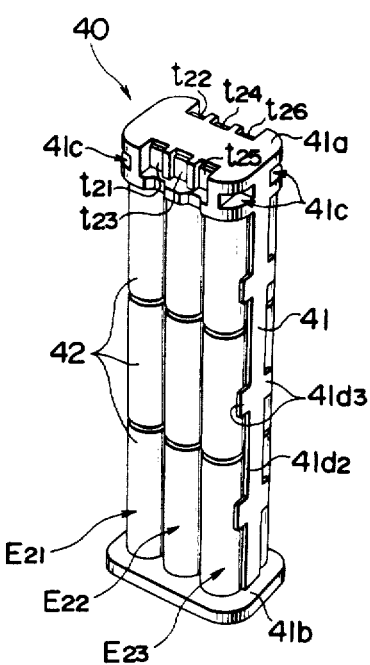

BATTERY CONTAINMENT APPARATUS FOR ELECTRONIC FLASH

BACKGROUND OF THE INVENTION

The invention relates to a battery containment apparatus for electronic flash, and more particularly, to such apparatus for use with a portable electronic flash capable of providing an increased amount of flashlight emission.

As is well recognized, an ordinary electronic flash is provided as a portable construction so that a flash photography in the outdoor is enabled, and is fed with power from a source battery which is either internally housed within or externally connected to the electronic flash. A portable electronic flash capable of providing an increased amount of flashlight emission and which may be used in the field of press photography includes a main capacitor having a high capacitance so that a high guide number is available. A plurality of source batteries are either contained within or externally connected to the electronic flash in order to charge such capacitor rapidly. Accordingly, a battery containment apparatus is provided which contains the plurality of batteries to feed the electric circuit of the flash.

FIGS. 1 and 2 show several examples of conventional battery containment apparatus for electronic flash. In FIG. 1, an electronic flash includes a body 1, from which depends downwardly a grip 2 in which a plurality of source batteries 3 are contained. Another battery containment apparatus is shown in FIG. 2 where a holder 4 separate from the body 1 of the electronic flash contains a plurality of source batteries 3 and is electrically connected to the body 1 through a connection cord 5.

In conventional battery containment apparatus as illustrated in FIGS. 1 and 2, the plurality of batteries 3 contained therein are all connected in series, thereby forming a single d.c. source. This causes a large current drain from the respective batteries 3 when charging a main capacitor of the electronic flash, substantially reducing the discharge rate of the batteries 3 to prevent an efficient utilization of the battery capacity.

Where an electronic flash requires a plurality of d.c. sources, for example, where it includes a plurality of DC/DC converters which are fed from a plurality of d.c. sources, a plurality of battery containment apparatus must be connected with the electronic flash, thus disadvantageously degrading the convenience of portable use and ease of operation of the electronic flash.

SUMMARY OF THE INVENTION

In view of the foregoing, it is an object of the invention to provide a battery containment apparatus for electronic flash including a plurality of source batteries, which are divided into a plurality of battery banks, the batteries in each bank being connected in series, thereby providing a plurality of d.c. sources.

It is another object of the invention to provide a battery containment apparatus for electronic flash which contains a plurality of source batteries in a compact manner and in which batteries in each bank are connected in series with each other with a minimum amount of interconnecting means to provide a plurality of d.c. sources, which are available from respective output terminals located at optimum positions.

It is a further object of the invention to provide a battery containment apparatus for electronic flash which permits dry cells of A3 type to be inserted into a grip of the body of an electronic flash in a very compact manner and including a restrictor or stop which prevents an excessive insertion of the apparatus into the grip by utilizing the fact that a dry cell of A3 type has a length which is slightly greater than three times its diameter.

In accordance with the invention, a plurality of source batteries are divided into a plurality of battery banks to form a plurality of d.c. sources. This reduces the load current of each battery, increasing its utilization efficiency. In this manner, a time period required to charge an electronic flash is reduced while the number of available emissions is increased. Since a single battery containment apparatus is capable of providing a plurality of d.c. sources, the convenience of portable use and ease of operation of the electronic flash is enhanced Also according to the invention, the apparatus contains source batteries arranged in a compact manner, and the electrodes of the individual batteries are connected together by their mutual contact or by the use of resilient conductive contacts, thus minimizing interconnecting means such as lead wires. Also, the distance between the electrodes of the batteries and output terminals is minimized.

In accordance with the invention, an assembly of six dry cells of A3 type which are disposed axially aligned with each other in a two row and three column array exhibits an outer profile of configuration and size which is suitable to be held by one hand, thereby enabling such plurality of cells to be received compactly within the grip of an electronic flash. Two of the dry cells which are disposed in the lower tier which has an outer profile of a length and a thickness which are suitable to limit the insertion into the grip of the battery containment apparatus, thus simultaneously defining a stop for the insertion. As a result, there is provided a battery containment apparatus for electronic flash which has an increased capacity and a reduced size while presenting an improved ease of operation and portable use as compared with the prior art.

BRIEF DESCRIPTION OF THE DRAWINGS

FIG. 3 is a perspective view, partly broken away, of a battery containment apparatus for electronic flash which is constructed in accordance with one embodiment of the invention, as mounted in an electronic flash;

FIG. 4 is a perspective view, partly broken away, of the battery containment apparatus shown in FIG. 3 which is partly pulled out of the electronic flash;

FIG. 28 is a perspective view of a battery containment apparatus for electronic flash which is constructed in accordance with a still further embodiment of the invention; and FIG. 29 is a perspective view of the apparatus shown in FIG. 28 in which batteries are received.

DESCRIPTION OF PREFERRED EMBODIMENTS

Figure 1:
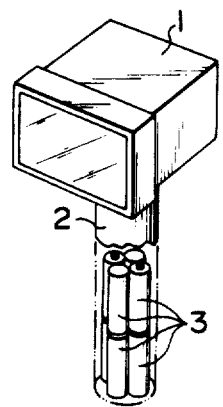
FIGS. 1 and 2 are perspective views, partly broken away, of examples of battery containment apparatus for electronic flash which are used in the prior art.
Figure 2:
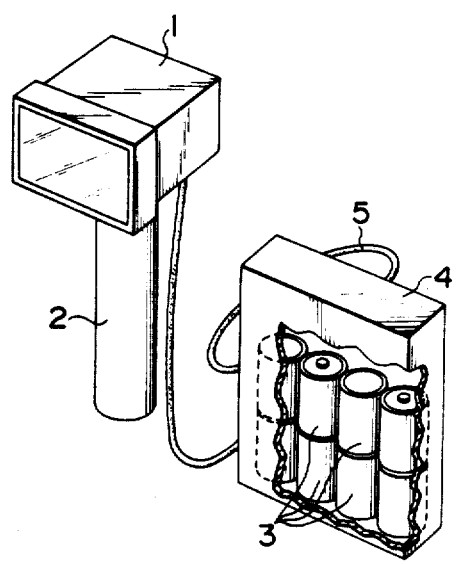

Referring to FIG. 3, there is shown a battery containment apparatus for electronic flash constructed in accordance with one embodiment of the invention, as it is mounted in an electronic flash. The apparatus is also shown in FIG. 4 as it is partly pulled out of the electronic flash.

A battery containment apparatus 20 according to the embodiment shown is adapted to be mounted in an electronic flash 10, which includes a casing 11 having a pair of windows 11a, 11b formed in its front side for allowing the transmission of flashlight emitted, a base 12 which permits the casing 11 to be angularly movable through a limited angle about a horizontal axis, not shown, and a pipe-shaped grip 13 which depends downwardly from the bottom of the base 12. The windows 11a, 11b are juxtaposed in vertical alignment and are defined by rectangular transparent material, and a pair of parabolic light reflectors 14a, 14b and a pair of flash discharge tubes FL1, FL2 are disposed behind such windows.

Figure 6:
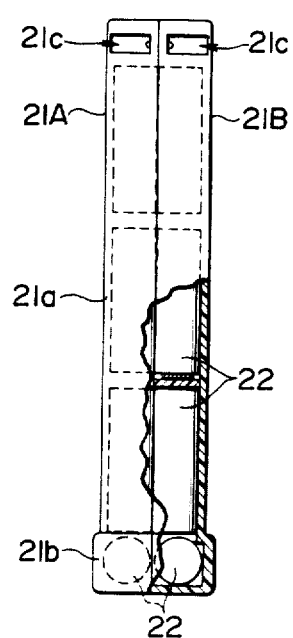
FIG. 6 is a front view, partly broken away, of the battery containment apparatus shown in FIG. 4.
Figure 7:
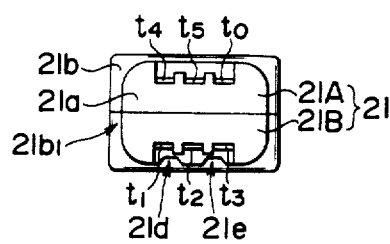
FIG. 7 is a plan view of the battery containment apparatus shown in FIG. 4.
Figure 8:
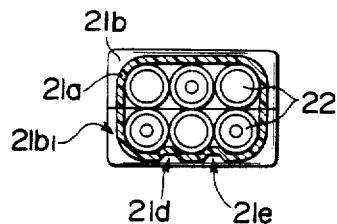
FIG. 8 is a cross section of the battery containment apparatus shown in FIG. 4, as taken along the line VII--VIII shown in FIG. 5.
Figure 9:
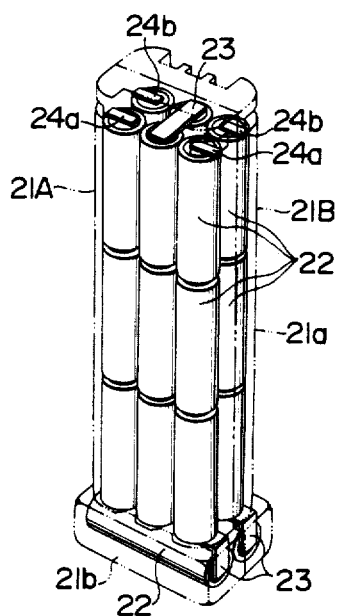
FIG. 9 is a perspective view illustrating the disposition of batteries within the apparatus shown in FIG. 4.
Figure 10:
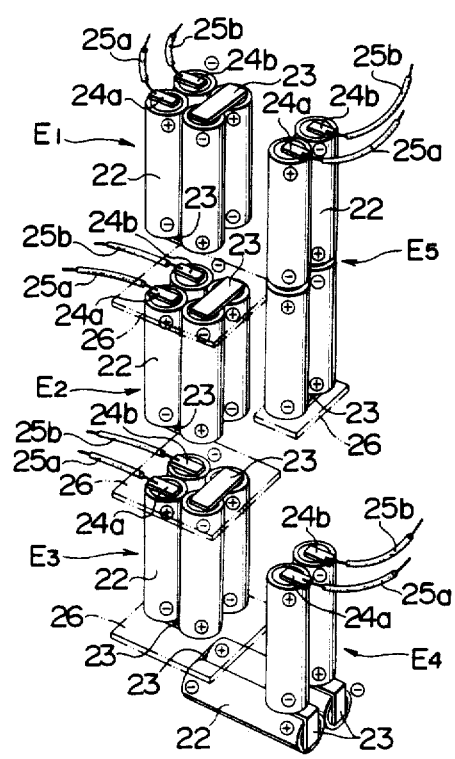
FIG. 10 is an exploded perspective view of the battery containment apparatus shown in FIG. 4, illustrating the interconnection between batteries.
Figure 11:
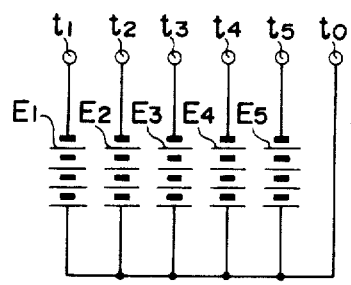
FIG. 11 is a circuit diagram of the apparatus shown in FIG. 4.

The battery containment apparatus 20 comprises a pipe-shaped casing 21 formed by a pair of longitudinally split casing halves 21A, 21B disposed in abutting relationship. A hollow rectangular stop 21b is formed on the bottom of each casing half to restrict the insertion of the casing into the grip of the electronic flash. Twenty batteries 22 are received in the casing 21 (see FIG. 9). Each of the batteries 22 comprises a re-chargeable dry cell of A3 type, for example, a nickel-cadmium cell. As shown in FIGS. 6, 8 and 9, when they are received into a portion 21a of the casing 21 which is adapted to be inserted into the grip, eighteen batteries are stacked together in three tiers which are vertically aligned, each tier including two rows and three columns. When so disposed, these batteries are aligned in the vertical direction. The remaining two cells 22 are horizontally disposed in the direction of the row so as to extend across the three columns and are received within the stop 21b of the casing 21. When the batteries 22 are contained within the casing 21, they are divided into five banks of four batteries each, as shown in FIG. 10, and the batteries 22 in each bank are electrically connected in series, thus defining five d.c. sources E1 to E5. Specifically, four batteries 22 disposed in the upper tier in the two left-most columns are connected in series to define a first d.c. source E1. Four batteries 22 disposed in the middle tier in the two left-most columns are connected in series to define a second d.c. source E2. Four batteries 22 disposed in the lower tier in the two left-most columns are connected in series to define a third d.c. source E3. Two batteries 22 horizontally disposed within the stop 21b and two other batteries 22 disposed in the lower tier in the right-most column are connected in series to define a fourth d.c. source E4. Four batteries disposed in the upper and the middle tier in the right-most column are connected in series to define a fifth d.c. source E5. Individual batteries 22 are disposed to locate the indicated poles in a manner as shown in FIG. 10, and four batteries 22 in each bank are connected in series with each other by utilizing either three or one conductive piece 23 which interconnects adjacent poles of opposite polarities except for the poles which are located at the opposite ends of the series connection. The positive pole of each of the first to the fifth d.c. source E1 to E5 is connected through a lead conductor 24a and a lead wire 25a to an output terminal t0 which is common to all of the sources. As shown in FIGS. 4 and 7, the output terminal t0 is disposed in a recess formed in the upper end of the sidewall of the right-hand casing half 21B. The negative poles of the first to the fifth d.c. source E1 to E5 are connected through respective lead conductors 24b and lead wires 25b to five negative pole output terminals t1 to t5 separately, which are disposed in recesses formed in the upper end of the sidewall of the casing halves 21A, 21B. Consequently, the electrical circuit of the apparatus 20 can be represented as shown in FIG. 11. It is to be understood that each of the d.c. sources E1 to E5 is packaged in an insulating sheet 26 (see FIG. 10) formed of a thermoplastic resin such as vinyl chloride resin so as to be insulated from each other when received within the casing 21. After the batteries are received in the casing 21, the casing halves 21A and 21B are secured together as by set screws, thereby preventing any battery being inadvertently removed from of the casing.

Figure 5:
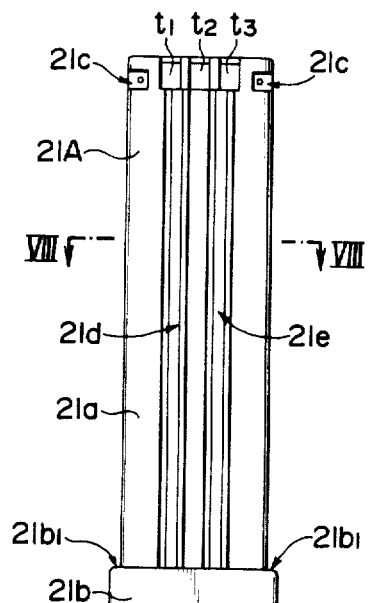
FIG. 5 is a side elevation of the battery containment apparatus shown in FIG. 4.

As shown in FIG. 7, the recesses in which the output terminals t0 to t5 are disposed are formed in the left- and right-hand sidewalls of the casing 21 so that three recesses are spaced apart in the direction of the row on each side. The output terminals t0 to t5 are separately formed in each recess. Adjacent to its upper end, the end walls of the casing 21 are formed with pairs of laterally spaced detent grooves 21c which serve a click stop action. The purpose of these detent grooves is to provide a temporary anchorage of the apparatus 20 to the electronic flash 10 by engagement with leaf springs (not shown) disposed in the latter whenever the apparatus 20 is inserted into the grip 13, as indicated in FIG. 3. As shown in FIGS. 5 and 8, a pair of longitudinal flutes 21d and 21e are formed in the left-hand sidewall of the casing 21 and are spaced apart a given distance. The flutes 21d, 21e cooperate with ribs (not shown) formed on the internal surface of the grip 13 to prevent an inadvertent insertion of the apparatus 20 into the electronic flash 10 in a wrong orientation, since then the output terminals t0 to t5 will not be properly connected to the electrical circuit of the electronic flash. A dry cell of A3 type has a length which is slightly greater than three times its diameter, and accordingly the stop 21b slightly projects beyond the casing portion 21a which is adapted to be inserted into the grip. As a result, when the apparatus 20 is received within the electronic flash 10, the edge of the grip 13 around its opening will bear against the upper surface 21b of the stop 21b, whereby the stop 21b is effective to prevent the apparatus 20 from being inserted excessively deep into the grip 13.

Figure 12:
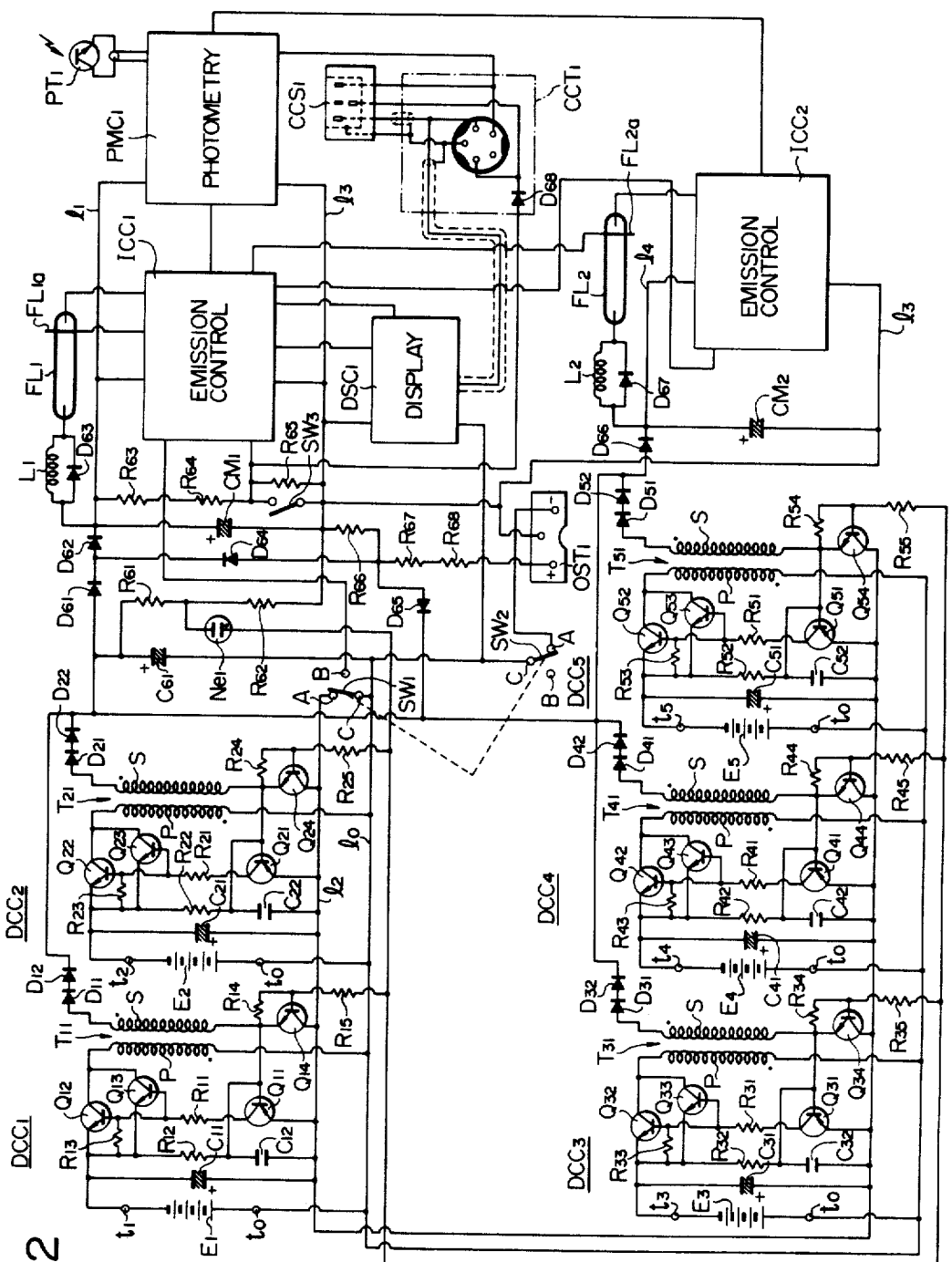
FIG. 12 is a circuit diagram of an electronic flash to which the battery containment apparatus of FIG. 4 is connected.

When the apparatus 20 is mounted in the electronic flash 10 in the manner mentioned above, the positive terminal t0 and the negative output terminals t1 to t5 separately engage mating input terminals (not shown) formed inside the electronic flash 10, whereby the first to the fifth d.c. sources E1 to E5 are connected to the electrical circuit of the electronic flash which is shown in FIG. 12. As shown, the electrical circuit of the electronic flash includes five DC/DC converters DCC1 to DCC5, which are identical in design, but which are separately driven by one of the d.c. sources E1 to E5. These five converters are used to charge a pair of main capacitors CM1 and CM2 in order to enable the emission of flashlight from the pair of flash discharge tubes FL1, FL2.

Since the converters are designed in an identical manner as mentioned only, the converter DCC1 will be specifically described. The converter comprises a step-up transformer T11, feedback transistor Q11 of PNP type, main transistors Q12 and Q13 of NPN type, a switching transistor Q14 of NPN type, a current superimposing capacitor C11, a capacitor C12 which is used to bypass a back e.m.f. from the transistor Q11, rectifier diodes D11, D12 and resistors R11 to R15. The first d.c. source E1 has its positive pole connected through the common positive output terminal t0 to a common ground bus 10 and has its negative pole connected through the first negative output terminal t1 to the emitters of the main transistors Q12, Q13. The transformer T11 has a primary winding P, one end of which is connected to the ground bus 10 and the other end of which is connected to the collectors of the main transistors Q12, Q13. The transformer T11 also has a secondary winding S, one end of which is connected to the base of the feedback transistor Q11 and to the emitter of the switching transistor Q14, and the other end of which is connected to the anode of the rectifier diode D11. The feedback transistor Q11 has its emitter connected to a supply bus 12 and its collector connected through resistor R11 to the bases of the main transistors Q12, Q13. The base of the transistor Q11 is connected through resistor R12 to the emitters of the main transistors Q12, Q13 and is also connected through capacitor C12 to the bus 12. Resistor R13 is connected across the base and emitter of the main transistors Q12, Q13, and the capacitor C11 is connected between the emitters of the main transistors Q12, Q13 and the bus 12. The switching transistor Q14 has its collector connected to the bus 12, and its base connected through resistor R14 to the emitter of the transistor Q14 and also connected through resistor R15 to one end of a neon lamp Nel which operates to indicate the completion of a charging operation. The cathode of the rectifier diode D11 is connected to the anode of the rectifier diode D12.

Other converters DCC2 to DCC5 are quite similarly constructed as the above-mentioned converter DCC1, and therefore corresponding parts are designated by like reference numerals, to which FIGS. 10, 20, 30 and 40 are added, respectively.

The cathodes of the rectifier diodes D12, D22, D32, D42 and D52, which represent the output of each converter DCC1 to DCC5, are connected to one end of a capacitor C61 which is used to detect the charged voltage. These cathodes are also connected through diodes D61, D62 to one end of one main capacitor, CM1, and also connected through a diode D66 to one end of the other main capacitor CM2. The other end of the capacitor C61 is connected to the common bus 10, and this capacitor is adapted to be charged to the same voltage as the main capacitors CM1, CM2 which have their other end connected to the bus 10 through a display circuit DSC1. The capacitor C61 is shunted by a series combination of resistors R61 and R62, with the junction therebetween being connected to the other end of the neon lamp Nel. Thus, the voltage to which the capacitor C61 is charged is divided by the resistors R61 and R62, and when the voltage across the resistor R62 exceeds an illumination initiate voltage of the neon lamp Nel, the charge stored across the capacitor C61 flows through the resistor R61 and the neon lamp Nel to the bases of the switching transistors Q14, Q24, Q34, Q44 and Q54, respectively, thus turning them on while turning the feedback transistors Q11, Q21, Q31, Q41 and Q51 off. The converters DCC1 to DCC5 then cease to operate. The capacitor C61 has a capacitance which is substantially reduced as compared with the capacitance of the main capacitors CM1 and CM2, and hence the capacitor C61 discharges rapidly to cause the neon lamp Nel to be extinguished, whereupon the converters DCC1 to DCC5 resume their operation to charge the capacitor again. In this manner, the capacitor C61 repeats a charging and a discharge operation, and cooperates with the lamp Nel and the transistors Q14 to Q54 to maintain the voltage across the main capacitors CM1 and CM2 substantially at a given level.

A power switch SW1 is connected across the buses 12 and 10. The power switch SW1 is in the form of a changeover switch having a movable contact C connected to the bus 10 and having a fixed contact A connected to the bus 12. When the switch SW1 is thrown to bring the movable contact to engage the fixed contact A, a path across the buses 10, 12 is completed through the switch SW1, feeding the individual converters DCC1 to DCC5. The switch SW1 also has another fixed contact B connected to one of emission control circuits, ICC1. When the switch is thrown to the fixed contact B, the converters cease to be fed and hence cease to operate, and simultaneously an emission inhibit signal is supplied to the emission control circuit ICC1, preventing the emission of flashlight from the flash discharge tubes FL1 and FL2.

The power switch SW1 is mechanically interlocked with another power switch SW2 which is also in the form of a changeover switch. The power switch SW2 has a movable contact C connected to the common bus 10 and a fixed contact A connected to a contact of negative polarity of a terminal assembly OST1 associated with an external power supply. The switch SW2 has also another fixed contact B which is left without connection. The terminal assembly OST1 has a contact for positive polarity, which is connected through resistors R68 and R67 to the anode of diode D64, to the anode of diode D65 and to one end of resistor R66. The cathode of diode D64 is connected to the junction between diodes D61 and D62, and the cathode of diode D65 is connected to the anodes of diodes D61 and D66. The other end of resistor R66 is connected to a supply bus 13 which is in turn connected to the other end of the main capacitors CM1 and CM2. The bus 13 is connected to the common bus 10 through the display circuit DSC1. The terminal assembly OST1 also has a common ground contact which is connected to the bus 13. Accordingly, when an external power supply is connected with the terminal assembly OST1 and the power switch SW2 is thrown to its fixed contact A, the main capacitors CM1 and CM2 can be charged from the external power supply.

The emission control circuit ICC1 is connected across buses 11, 13 which are connected with the opposite ends of the main capacitor CM1. A series combination of the flash discharge tube FL1 and a parallel combination of a coil L1 and diode D63 is connected between the bus 11 and the circuit ICC1. The other emission control circuit ICC2 is connected between buses 14 and 13 which are in turn connected with the opposite ends of the other main capacitor CM2. A series combination of the other flash discharge tube FL2 and a parallel combination of a coil L2 and diode D67 is connected between the bus 14 and the circuit ICC2. The flash discharge tubes FL1 and FL2 have trigger electrodes FL1a and FL2a which are connected to the emission control circuit ICC1 so as to initiate the emission of their flashlight in response to an output from the latter circuit.

A series combination of resistors R63, R64 and a trigger switch SW3, which is used to provide a test of the emission of flashlight, is connected in shunt with the main capacitor CM1. The trigger switch SW3 is shunted by a resistor R65, with the junction between the resistor R64 and the switch SW3 being connected to the emission control circuit ICC1 and also connected through a diode D68 to a contact assembly CCS1 and a connector CCT1 for connection with a photographic camera. Thus, the emission control circuit ICC1 can be triggered by a signal fed from an associated camera or by the closure of the switch SW3, thus initiating the emission of flashlight from the discharge tubes FL1 and FL2.

The display circuit DSC1 operates to indicate the completion of a charging operation and an automatic emission control within the electronic flash or the camera. This circuit is connected to both the contact assembly CCS1 and the connector CCT1 through a shielded cable. The circuit DSC1 is fed from the emission control circuit ICC1.

A photometric circuit PMC1 is connected across the buses 11 and 13. A photoelectric transducer element PT1 is connected to the photometric circuit PMC1, which operates to integrate a photocurrent produced by the transducer element PT1 in order to provide an automatic emission control signal fed to the emission control circuits ICC1 and ICC2 whenever a given exposure level is reached. It also produces an automatic emission control signal which is supplied to the emission control circuits ICC1 and ICC2 in response to a signal from an associated camera which is fed through the contact assembly CCS1 or the connector CCT1.

In operation, when the power switch SW1 is thrown to its fixed contact A, the converters DCC1 to DCC5 are fed from the d.c. sources E1 to E5, respectively, through the supply bus 12, thus initiating their operation. Each of these converters operates in an identical manner, and hence the operation of only the converter DCC1 will be described. Initially, there occurs a current flow through the emitter-base path of the feedback transistor Q11 and the resistor R12, thus turning this transistor Q11 on. Simultaneously, a charging current flows through the capacitor C11, which is therefore charged with a polarity so that its terminal connected to the bus 12 is positive. As the transistor Q11 is turned on, the main transistors Q12 and Q13 are turned on, whereby there is produced a current flow through the primary winding P of the step-up transformer T11 by a current drain from the source E1 and the charge stored on the capacitor C11.

A current flow through the primary winding of the transformer T11 develops a high induced voltage across the secondary winding S thereof, whereby a positive feedback current flows from the main capacitors CM1 and CM2, further increasing the current flow through the primary winding. After the current flow through the primary winding has increased to a degree and then begins to decrease, the back e.m.f. developed across the secondary winding S is applied to the base of the feedback transistor Q11, turning it off. The back e.m.f. is buffered by the capacitor C12, which thus operates to prevent the transistor Q11 from being destroyed. When the transistor Q11 turns off, the main transistors Q12 and Q13 also turn off, whereby the inductive energy stored in the primary winding P produces a back e.m.f., which produces an oscillating voltage to be produced by an LC oscillating circuit comprising the inductance and a variety of distributed capacitances formed in the winding and the common bus. The oscillating voltage is transmitted from the primary winding P to the secondary winding S, and during a cycle when the transistor Q11 is positively biased, the transistor Q11 is turned on as are the main transistors Q12 and Q13. The described process is then repeated to sustain the oscillation.

Other converters DCC2 to DCC5 produce a self-maintained oscillation in a manner similar to that mentioned above in connection with the converter DCC1. During such oscillation, the positive feedback current flows to the main capacitors CM1 and CM2 through the combinations of rectifier diodes D11, D12; D21, D22; D31, D32; D41, D42; and D51, D52, thus charging the main capacitors. The above-mentioned combinations of rectifier diodes prevent the occurrence of circulating currents which may flow between different converters DCC1 to DCC5 if these converters oscillate with different phases. When the main capacitors CM1 and CM2 are charged to a given level, the neon lamp Ne1 is illuminated, and the resulting current flow turns the switching transistors Q14 to Q54 on, thus causing the converters DCC1 to DCC5 to cease their operation temporarily.

The battery containment apparatus 20 for electronic flash of the described embodiment can be mounted in the electronic flash 10 by initially fitting the upper end of the portion 21a thereof into the lower opening of the grip 13 and then pushing the apparatus 20 into the grip. As the apparatus 20 is pushed into the grip 13, the edge of the opening of the grip bears against the upper surface $21b_1$ of the stop 21b, thus preventing the apparatus from being further inserted into the grip. Simultaneously, the detent grooves 21c engage the leaf springs mentioned above, thus temporarily locking the apparatus 20 against withdrawal. When the apparatus 20 is mounted in the electronic flash 10 in this manner, the output terminals t0 to t5 engage mating input terminals, whereby the d.c. sources E1 to E5 are connected to the electrical circuit of the electronic flash.

When it is desired to remove the apparatus 20 from the electronic flash 10, the stop 21b of the apparatus which is externally exposed may be engaged by a finger and pulled to force the apparatus out of the grip 13. This disengages the detent grooves 21c from their associated leaf springs, allowing the portion 21a of the apparatus to be moved out of the grip 13.

It will be seen that the apparatus 20 of the present embodiment is constructed so that the batteries 22 once contained are enclosed within the casing so as not to be removed. However, since the batteries are of re-chargeable type, when they are exhausted, the apparatus 20 may be connected to a given charger, not shown. All that is required to perform such charging operation is to connect the output terminals t0 to t5 formed on the apparatus 20 with corresponding terminals of a charger.

As described above, the battery containment apparatus 20 of the present embodiment allows five d.c. sources to be formed, each by a series connection of four of twenty dry cells of A3 type which are contained therein in a compact form for insertion into the grip of the electronic flash, thus achieving a reduced size and an increased capacity while simultaneously affording an ease of handling.

Figure 13A:
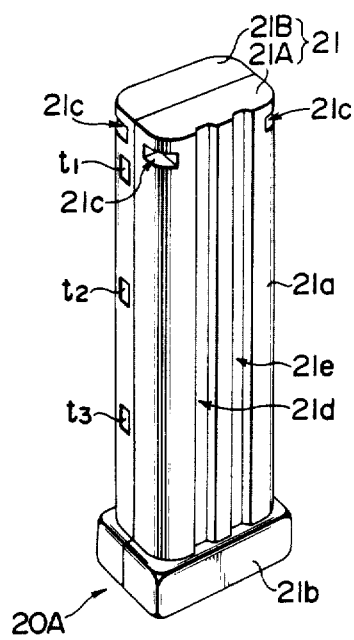
FIGS. 13(A) and (B) are perspective views of modifications of the apparatus shown in FIG. 4.
Figure 13B:
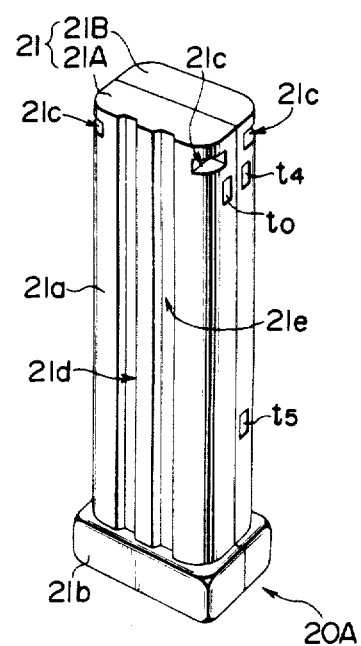

FIGS. 13(A) and (B) show a modification of the battery containment apparatus shown in FIGS. 3 to 11. In this embodiment, a battery containment apparatus 20A differs from the previous embodiment in that the terminals t0 to t5 are formed in spaced apart relationship on the front and the rear end walls of the casing 21, in contrast to the previous embodiment in which these terminals are formed in recesses which are formed in the opposite sidewalls of the casing 21 adjacent to its upper end. Specifically, negative output terminals t1, t2 and t3 are formed on the rear end face of the right-hand casing half 21B toward the top, at the middle and toward the bottom thereof while the remaining negative output terminals t4 and t5 are formed on the front end face of the same casing half 21B toward the top and the bottom thereof. The common, positive output terminal t0 is formed on the front end face of the left-hand casing half 21A toward the top thereof. As shown, these terminals are externally exposed, and engage mating input terminals, not shown, formed on the internal surface of the grip 13 when the apparatus 20A is mounted in the electronic flash 10 (see FIG. 3), thus completing the connection of the d.c. sources E1 to E5 with the electrical circuit of the electronic flash.

In this embodiment, the distances measured between the negative or the positive pole of each source E1 to E5 to the output terminals t0 to t5 is reduced, permitting the length of the lead wires 25a, 25b to be reduced or allowing the terminals and the lead conductors 24a, 24b to be formed in an integral manner. Consequently, the assembly of the apparatus 20A is facilitated, reducing the number of parts.

Figures 14, 15:
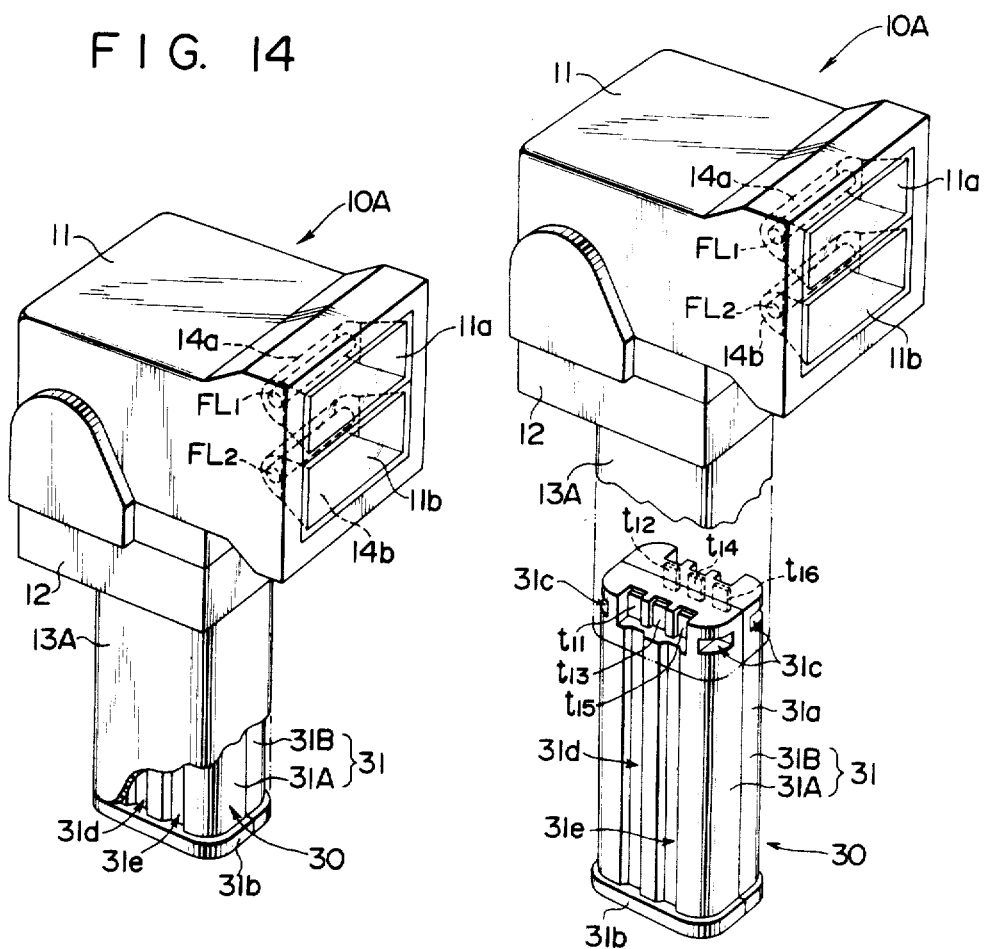
FIG. 14 is a perspective view, partly broken away, of a battery containment apparatus for electronic flash which is constructed in accordance with another embodiment of the invention, as mounted in an electronic flash.
FIG. 15 is a perspective view, partly broken away, of the apparatus shown in FIG. 14 as it is partly pulled out of the electronic flash.

FIG. 14 shows a battery containment apparatus according to another embodiment of the invention as it is mounted in an electronic flash, and FIG. 15 shows the same apparatus as it is slightly pulled out of the electronic flash.

In this embodiment, a battery containment apparatus 30 is mounted in an electronic flash 10A having a grip 13A which is of a reduced length as compared with the grip 13 of the electronic flash 10 shown in FIGS. 3 and 4. Except for the electrical circuit (see FIG. 21), the remaining arrangement is similar to the previous embodiment, and hence corresponding parts are designated by like reference characters without repeating their description.

Figure 16:
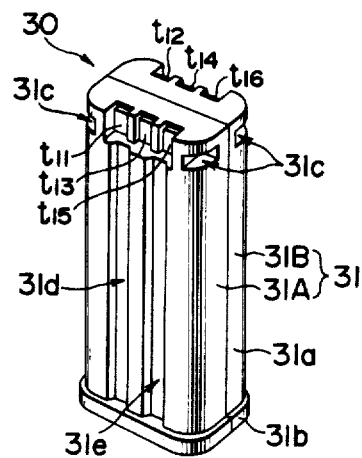
FIG. 16 is a perspective view of the apparatus shown in FIG. 15.
Figure 17:
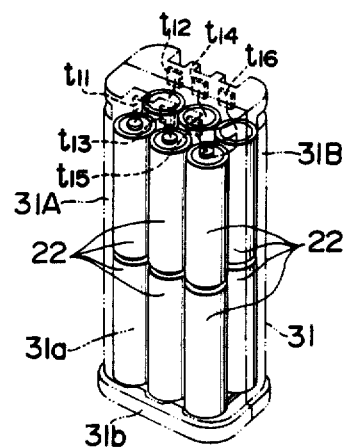
FIG. 17 is a perspective view showing the disposition of batteries within the apparatus of FIG. 15.
Figure 18:
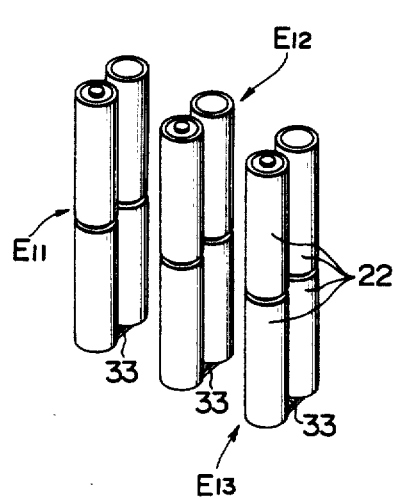
FIG. 18 is an exploded perspective view, illustrating the interconnection of batteries within the apparatus of FIG. 15.
Figure 19:
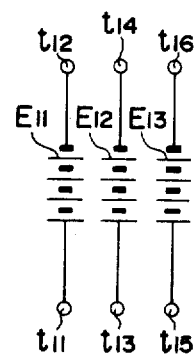
FIG. 19 is a circuit diagram of the apparatus shown in FIG. 15.

The battery containment apparatus 30 of this embodiment essentially comprises an elongate pipe-shaped casing 31 including a pair of longitudinally split casing halves 31A, 31B (FIG. 16) which are disposed in abutting relationship, and twelve source batteries 22 (see FIG. 17) which are received within the casing 31. Each of the batteries 22 comprises a re-chargeable dry cell of A3 type, similar to those used in the apparatus 20 shown in FIGS. 3 to 11. As shown in FIG. 17, the batteries 22 are disposed in two tiers, each of which comprises two rows and three columns. In this manner, the batteries are axially aligned when they are received within the casing 31. As shown in FIG. 18, four batteries 22 form a battery bank, and in each bank, the two batteries 22 disposed in the lower tier have their adjacent poles disposed to be of opposite polarities and connected together by a conductor 33. In this manner, three d.c. sources E11 to E13 are formed. Positive poles of the sources E11 to E13 are connected to positive output terminals t11, t13 and t15, respectively, which are formed in corresponding recesses formed in the sidewall of the left-hand casing half 31A adjacent to its upper end. The negative poles of the sources E11 to E13 are connected to negative output terminals t12, t14 and t16, respectively, which are formed in corresponding recesses formed in the sidewall of the right-hand casing half 31B adjacent to its upper end. Accordingly, the electrical circuit of the apparatus 30 can be indicated as shown in FIG. 19.

Figure 20:
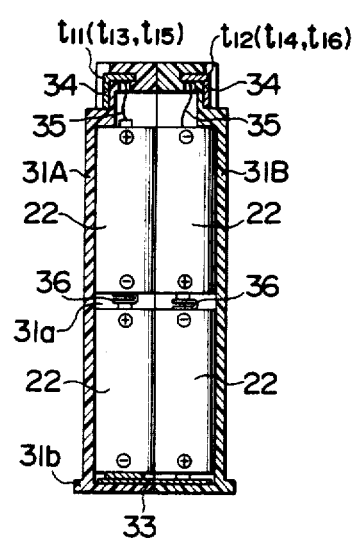
FIG. 20 is a longitudinal section of the apparatus of FIG. 15.

As shown in FIG. 20, the output terminals t11 to t16 are actually formed by conductive contacts 34 formed in the recesses which are in turn formed in the sidewalls of the casing halves 31A, 31B adjacent to their upper end. A lead wire 35 connects either a positive or a negative pole located at the top of each source E11 to E13 to a corresponding terminal. Thus, the length of connection between the output terminals t11 to t16 and the poles of the source batteries 22 is minimized. In addition, the upper and the lower battery in each bank have their adjacent poles coupled together by a U-shaped resilient conductive piece 36 which is welded to the negative pole. The conductive contact 33 is welded to the negative pole of the battery located in the lower tier to provide a series connection between the batteries disposed in the lower tier.

Also in this embodiment, longitudinal flutes 31d, 31e which serve preventing an inadvertent insertion in the wrong orientation as well as detent grooves 31c which provide a click stop action are formed in the similar a manner similar to that shown in FIGS. 3 to 11. The bottom of the casing 31, which is located at the lower end of a portion 31a of the apparatus which is adapted to be inserted into the grip, projects slightly outward beyond the portion 31a to provide a stop 31b, which is effective to prevent the apparatus from being excessively inserted into the grip. By securing the casing halves 31A, 31B together by means of set screws, the batteries 22 can be securely confined within the casing 31.

Figure 21:
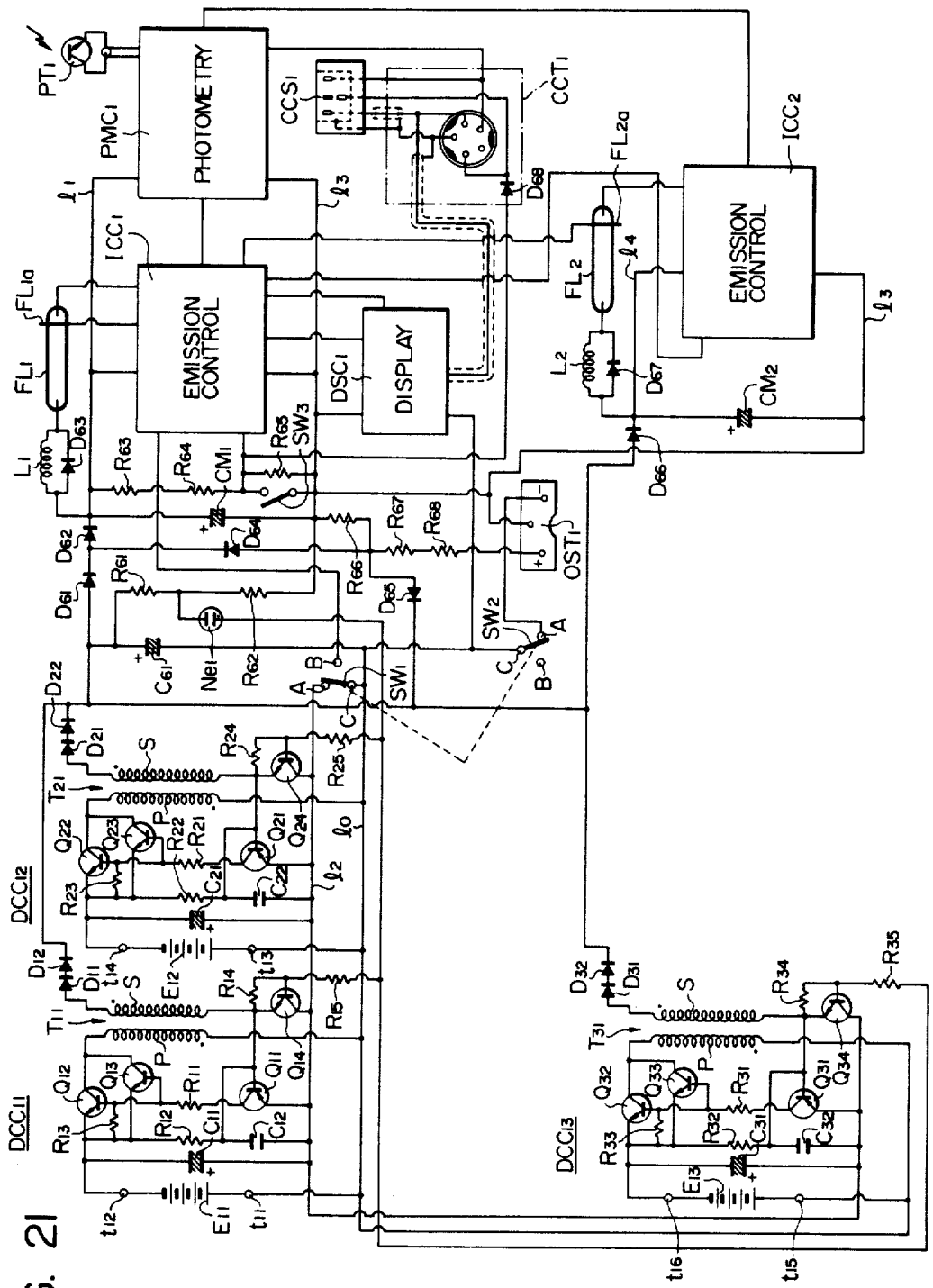
FIG. 21 is a circuit diagram of an electronic flash to which the apparatus of FIG. 15 is connected.

The apparatus 30 can be detachably mounted in the grip 13A of the electronic flash 10A. When the apparatus 30 is mounted in the electronic flash 10A (see FIG. 14), the positive terminals t11, t13 and t15 as well as the negative terminals t12, t14 and t16 engage six mating terminals, not shown, formed within the electronic flash separately, thus allowing the first to the third d.c. source E11 to E13 to be connected with the electrical circuit of the electronic flash which is shown in FIG. 21. Referring to FIG. 21, the electrical circuit of the electronic flash includes three DC/DC converters DCC11 to DCC13, which are constructed in an identical manner and which are separately driven by each of the three d.c. sources E11 to E13. A pair of main capacitors CM1 and CM2 are charged by these converters to cause the emission of flashlight from a pair of flash discharge tubes FL1, FL2.

It is to be noted that each of the converters DCC11 to DCC13 is constructed and connected in a manner similar to that to the converters DCC1 to DCC3 shown in FIG. 12. The electrical circuit of the electronic flash remains the same as that shown in FIG. 12 except that the converters DCC4 and DCC5 are omitted. Accordingly, the electrical circuit shown in FIG. 21 can be understood without repeating the description since corresponding parts are designated by like reference characters as before.

It is a feature of the apparatus 30 that all of the batteries 22 can be connected in series by forming a series connection between the terminals thereof externally. Accordingly, the apparatus can be used with an electronic flash which requires a power supply of an increased voltage, in addition to its use with an electronic flash which requires a plurality of low voltage supplies, thus permitting a flexible use of the apparatus. In addition, when charging the batteries within the apparatus, all the batteries 22 can be connected in series, thus achieving a uniform charging of the individual batteries 22.

Figure 22:
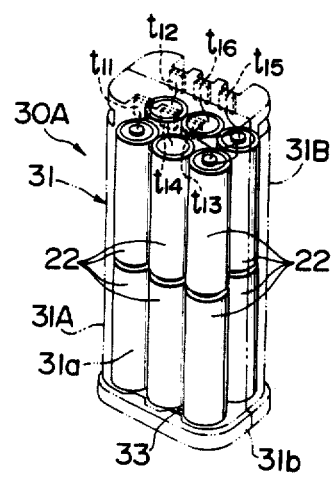
FIG. 22 is a perspective view, illustrating the disposition of batteries within a battery containment apparatus for electronic flash which is constructed in accordance with a further embodiment of the invention.
Figure 23:
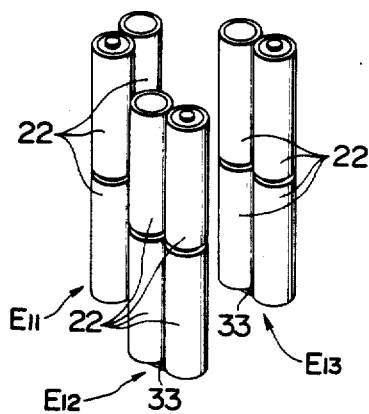
FIG. 23 is an exploded, perspective view illustrating the interconnection of batteries within the apparatus shown in FIG. 22.
Figure 24:
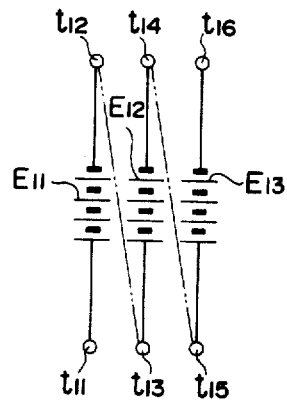
FIG. 24 is a circuit diagram of the apparatus of FIG. 22.

FIGS. 22 to 24 show a further embodiment of the invention. FIG. 22 shows batteries 22 as they are received in a portion 31a of a casing 31 which is adapted to be inserted into a grip. FIG. 23 illustrates the interconnection between the batteries 22. The casing 31 which is used in a battery containment apparatus 30A of this embodiment is constructed in a manner similar to the casing 31 shown in FIGS. 14 to 20, the primary difference being that the batteries 22 received within the apparatus 30A are combined in a different manner. Specifically, a battery bank which forms a second d.c. source E12 and another battery bank which forms a third d.c. source E13 are rotated 90° counter-clockwise, as viewed in plan view so as to be located opposite to each other in the direction of the column, rather than being aligned in the direction of the row as shown in FIGS. 14 to 20. Accordingly, the output terminals provided on the left-hand casing half 31A are arranged in the sequence of t11, t14 and t13 as viewed from the rear side while the output terminals provided on the right-hand casing half 31B are disposed in the sequence of t12, t16 and t15 as viewed from the rear side. However, the electrical circuit remains the same as the embodiment shown in FIGS. 14 to 20, as diagrammatically shown in FIG. 24. All the batteries 22 can be connected in series, by providing an interconnection between the terminals t12 and t13 and between the terminals t14 and t15, externally of the casing 31, as indicated by phantom lines in FIG. 24.

Figure 25:
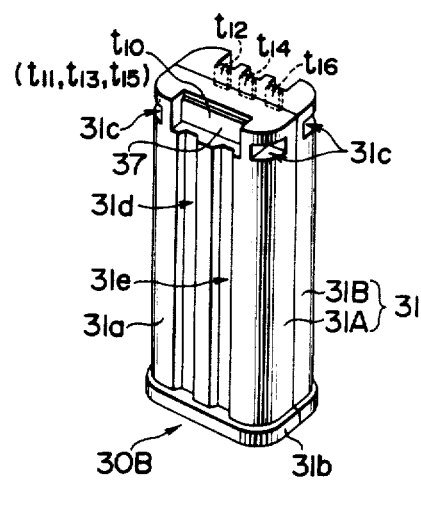
FIG. 25 is a perspective view of a battery containment apparatus for electronic flash which is constructed in accordance with still another embodiment of the invention.
Figure 26:
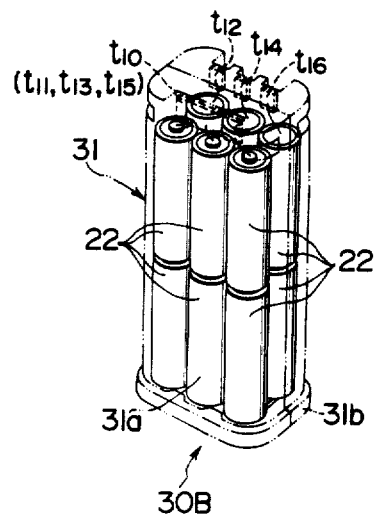
FIG. 26 is a perspective view illustrating the disposition of batteries within the apparatus of FIG. 25.
Figure 27:
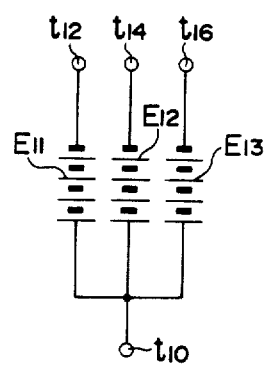
FIG. 27 is a circuit diagram of the apparatus of FIG. 25.

FIGS. 25 to 27 show still another embodiment of the invention. FIG. 25 shows the appearance of a battery containment apparatus 30B while FIG. 26 shows batteries 22 as they are received within a portion 31a of a casing 31 which is adapted to be inserted into a grip of an electronic flash. It will be apparent from FIGS. 25 and 26 that the apparatus 30B is constructed in quite the same manner as the apparatus 30 shown in FIGS. 14 to 20 except that positive terminals t11, t13 and t15 are combined into a single conductive bar 37, shown as an output terminal t10, which is elongate in the direction of the row. Accordingly, the construction will not be specifically described, only noting that the positive poles of the d.c. sources E11 to E13 are connected together to a single output terminal t10 as shown in FIG. 27. This reduces the number of output terminals, simplifying the construction and allowing a reduction in the manufacturing cost.

FIGS. 28 and 29 show a battery containment apparatus for electronic flash which is constructed according to a still further embodiment of the invention. As shown, a battery containment apparatus 40 essentially comprises a framework 41 having a top panel 41a for arranging output terminals thereon and a bottom panel 41b for disposing conductive contacts thereon, integrally formed on its upper and lower end, and eighteen batteries 42 which are detachably mounted in the framework 41. The framework 41 includes a middle vertical plate 41e having a length which is substantially equal to the combined length of three batteries 42. Four pairs of longitudinal ribs 41d are formed on both sides of the plate 41 in opposing relationship. Two pairs of ribs 41d₁ which are disposed inside are located so as to divide the vertical plate 41e into three equal sections, thus defining spaces for receiving the batteries 42. The remaining two pairs of ribs 41d₂ which are located on the opposite ends serve defining the space to receive the batteries 42, and are additionally formed with tabs 41d₃ at three vertically spaced points for locking the batteries 42 received therein against withdrawal. The top panel 41a of the framework 41 has a substantial thickness and is formed with recesses in its opposite sidewalls, in which positive output terminals t21, t23 and t25 and negative output terminals t22, t24 and t26 are formed. The terminals t21 to t26 extend through the top panel 41a to be exposed on the lower surface thereof, thus also serving as lead conductors for contact with the poles of the batteries 42. The front and the rear end wall of the top panel 41a are formed with detent grooves 41c at laterally spaced points, which provide a click stop action. Three conductive contacts 43 are disposed on the upper surface of the bottom panel 41b and extend through the vertical plate 41e, thus serving to interconnect the poles of opposite polarities on the lower end of batteries 42 which are located adjacent to each other on the opposite sides of the vertical plate 41e in the lowest tier. It will be noted that the bottom panel 41b extends slightly beyond the top panel 41a, viewed in the vertical projection, thus serving as a stop which prevents the apparatus from being excessively inserted into a grip.

The batteries 42 comprise dry cells of A3 type, which may be re-chargeable or non-chargeable. As shown in FIG. 29, eighteen batteries 42 are disposed within the apparatus 40 so as to define three rows and three columns on each side of the vertical plate 41e. When so disposed, each battery bank comprising six batteries disposed in a vertical plane is connected in series through the conductive contact 43, thus forming three d.c. sources E21 to E23. The positive poles of the sources E21 to E23 are connected to the positive terminals t21, t23 and t25, respectively, while the negative poles of the sources are connected to the negative terminals t22, t24 and t26, respectively.

The apparatus 40 thus constructed is also received into the grip 13 of an electronic flash as mentioned previously in connection with FIGS. 3 to 11 and the sources contained therein are connected to the electrical circuit of the electronic flash. The apparatus 40 permits non-chargeable cells, for example, alkali-manganese cells, to be used as the power source of an electronic flash, in addition to re-chargeable dry cells.

What is claimed is:

1. An electronic flash including battery containment apparatus which contains a plurality of batteries, characterized in that the plurality of batteries are divided into a plurality of battery banks, each of which comprises at least a pair of batteries which are disposed axially parallel to each other and juxtaposed and presenting poles of opposite polarities at axially remote ends, the apparatus further including a plurality of electrical connection means for electrically connecting the batteries of each bank electrically in series, each battery bank thus defining a DC source, a plurality of boosters housed within the electronic flash; said boosters being DC/DC converters; and a plurality of terminals which are connected to the terminals of the DC sources and define a single common ground terminal and a plurality of output terminals, the number of output terminals being equal to the number of boosters which are internally housed in the electronic flash and being electrically connected to the boosters.

2. An electronic flash according to claim 1 in which the batteries comprise re-chargeable dry cells.

3. An electronic flash according to claim 1 in which the batteries comprise non-chargeable dry cells.

4. An electronic flash according to claim 1 in which the plurality of battery banks are individually packaged by an insulating sheet of thermoplastic resin so as to be insulated from each other.

5. An electronic flash according to claim 1 in which the connection means comprise conductive contacts.

6. An electronic flash according to claim 1 in which the plurality of output terminals comprises a plurality of pairs of positive and negative output terminals.

7. An electronic flash according to claim 1, comprising a casing which contains the plurality of batteries therein, the casing including a portion which is adapted to be inserted into the hollow interior of a grip of an electronic flash, and a stop formed at the lower end of said portion of the casing for engaging said grip, the casing being detachably mounted in the grip of the electronic flash.

8. An electronic flash according to claim 1, comprising a framework having a top panel for disposing output terminals thereon and a bottom panel for disposing conductive contacts thereon integrally formed at its upper and lower ends, and batteries detachably mounted on the framework, the framework being detachably mounted in a grip of an electronic flash.

9. An electronic flash having a battery containment apparatus which contains a plurality of source batteries, the batteries being grouped into a plurality of battery banks, each bank comprising at least one pair of batteries disposed to be axially parallel to each other and juxtaposed and presenting their poles of opposite polarities at axially remote ends the apparatus including a plurality of connection means disposed for contact with a pair of positive and negative poles of adjacent batteries which are exposed at one end of each bank for connecting the batteries in each bank electrically in series, and a plurality of output terminals disposed adjacent to a pair of positive and negative poles of adjacent batteries which are exposed at the other end of each bank for connection with each of the plurality of battery banks, said electronic flash containing a plurality of booster (DC/DC converters) and including terminals for electrically connecting each battery bank to one of said boosters.

10. An electronic flash according to claim 9 in which the batteries comprise re-chargeable dry cells.

11. An electronic flash according to claim 9 in which the batteries comprise non-chargeable dry cells.

12. An electronic flash according to claim 9 in which the plurality of battery banks are disposed in a plurality of columns which are spaced apart in a direction perpendicular to the plane in which the pair of batteries or a stack of plurality of pairs of batteries are disposed.

13. An electronic flash according to claim 9 in which the connection means comprise conductive contacts.

14. An electronic flash according to claim 9 in which the plurality of output terminals include a single common output terminal of a first polarity and a plurality of output terminals of the opposite polarity.

15. An electronic flash according to claim 9 in which the plurality of output terminals include a plurality of pairs of positive and negative output terminals.

16. An electronic flash according to claim 9, comprising a casing for containing the plurality of batteries therein, the casing including a portion which is adapted to be inserted into the hollow interior of a grip of an electronic flash, and a stop formed on the lower end of said portion of the casing engageable with said grip, whereby the casing is detachably mounted in the electronic flash.

17. An electronic flash according to claim 9, comprising a framework having a top panel for disposing output terminals thereon and a bottom panel disposing conductive contacts thereon, integrally formed at its upper and lower ends, a plurality of batteries being detachably mounted on the framework, the framework being detachably mounted in a grip of an electronic flash.

18. An electronic flash including battery containment apparatus which contains a plurality of dry cells of A3 type and which is detachably mounted in the electronic flash, comprising:

a portion removeably inserted into the hollow interior of a grip of the electronic flash, so that the battery containment apparatus is detachably mounted in the electronic flash, the portion having a substantially rectangular cross section and receiving a plurality of dry cells in a plurality of axially aligned tiers, six dry cells of A3 type being disposed in two rows and three columns in each tier while maintaining their axiall parallel relationship, and a stop formed integrally with the bottom of said portion, the axial direction of the stop being the lengthwise direction of the rectangular configuration presented by the end face of dry cells disposed within said portion as a whole, the stop receiving a pair of dry cells of A3 type in juxtaposed relationship and arranged perpendicular to the dry cells extending into the grip of the electronic flash, the stop being adapted to bear against the edge of the opening of the grip of the electronic flash to prevent the apparatus from being excessively inserted into the grip.

19. A battery containment apparatus according to claim 1, in which each of the battery banks comprises a plurality of stacks of pairs of batteries arranged in the axial direction, each pair of batteries being disposed axially parallel to each other.

20. An electronic flash according to claim 1 further comprising a plurality of main capacitors for storage charge employed during flash photography;
a plurality of boosters coupled in parallel to each main capacitor whereby the booster, and hence the battery banks collectively charge an associated main capacitor to reduce the energy drain on any one battery bank.

21. The electronic flash of claim 20 further comprising diodes coupling the output of each booster to its associated main capacitor and being poled to prevent the output of any booster from being fed back to another booster coupled thereto.

22. The electronic flash of claim 1 wherein the electronic flash includes a hollow grip member having an open end; a flash control circuit; a casing containing battery banks, the top portion of the casing having contacks coupled to output terminals of the battery banks and being adapted for insertion into the hollow grip;
the bottom portion of the casing having a stop;
the battery banks being electrically connected to the electronic flash control circuit when the top portion of the casing in inserted into the grip and the stop engages the open end of said grip.

23. The electronical flash of claim 1 wherein the electronic flash includes a hollow grip having an open end;
a casing for removeable insertion into the open end of said grip;
said casing having an enlarged lower end forming a stop to limit the depth of insertion of the casing into the grip;
said lower portion including a storage region for receiving at least one of said battery banks whereby the batteries contained therein are aligned perpendicular to the batteries contained in the remaining portion of the casing.

24. The electronic flash of claim 1 wherein each battery bank includes at least two pairs of batteries being axially aligned to one another and stacked one upon the other.

25. The electronic flash of claim 9 wherein each battery bank includes at least two pairs of batteries being axially aligned to one another and stacked one upon the other.

* * * * *

UNITED STATES PATENT AND TRADEMARK OFFICE
CERTIFICATE OF CORRECTION

PATENT NO. : 4,530,034

DATED : July 16, 1985

INVENTOR(S) : Osamu Kawarada

It is certified that error appears in the above-identified patent and that said Letters Patent is hereby corrected as shown below:

Column 2, lines 62-63, change "VII-VIII" to --VIII-VIII--.

Column 5, line 51, change "mentioned only," to --mentioned previously, only--.

Column 11, line 7, delete "the similar".

Column 11, line 37, delete "to that".

Signed and Sealed this

Fifth Day of November 1985

[SEAL]

Attest:

Attesting Officer

DONALD J. QUIGG

Commissioner of Patents and Trademarks